March 17, 1931.  F. F. HILL  1,796,788
MAINTAINING AND INCREASING FLOW OF FAILING WELLS
Filed July 18, 1927
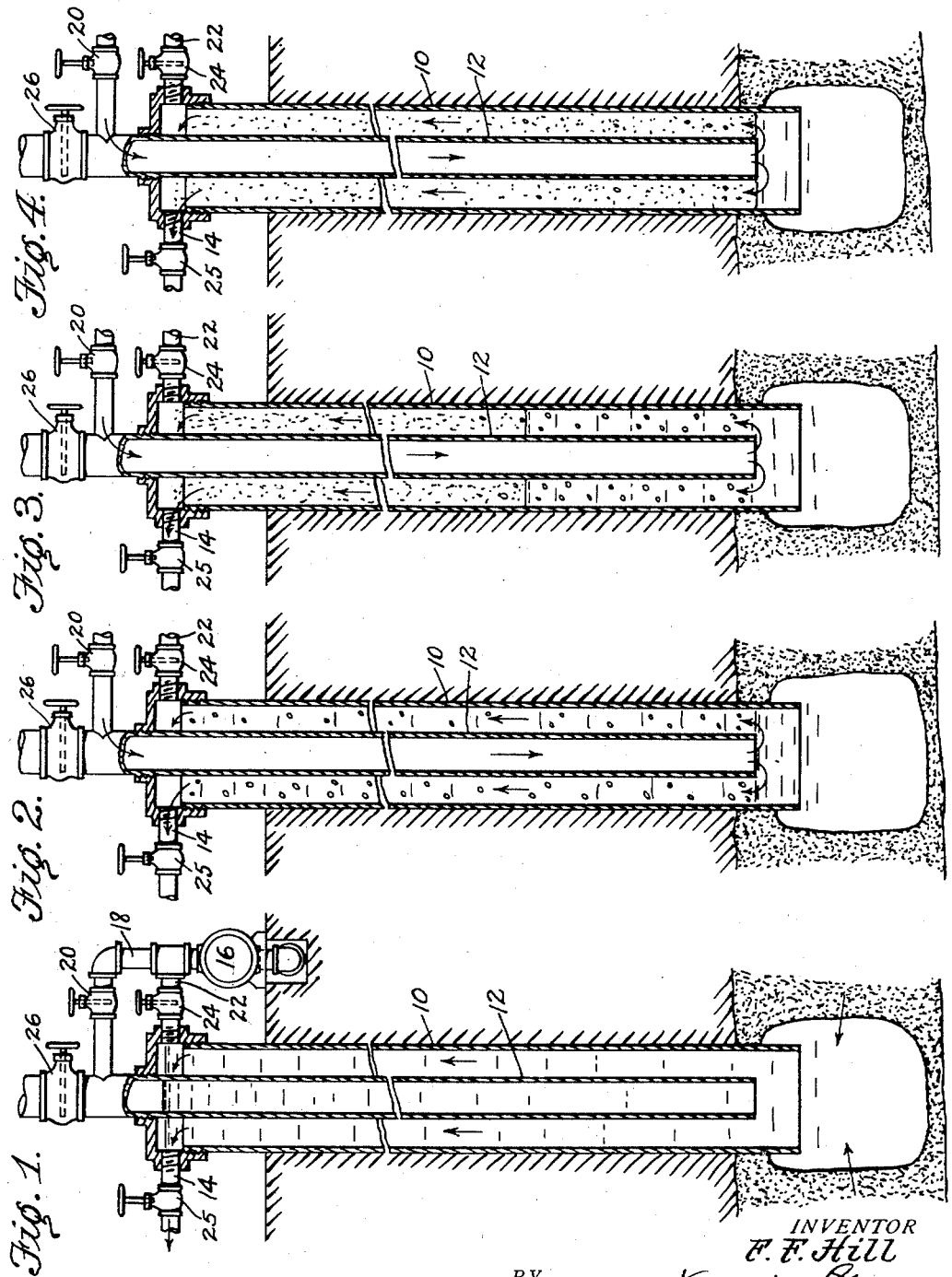
INVENTOR
F. F. Hill
BY
ATTORNEY Patented Mar. 17, 1931

1,796,788

UNITED STATES PATENT OFFICE

FRANK F. HILL, OF LOS ANGELES, CALIFORNIA, ASSIGNOR TO UNION OIL COMPANY OF CALIFORNIA, OF LOS ANGELES, CALIFORNIA, A CORPORATION OF CALIFORNIA

MAINTAINING AND INCREASING FLOW OF FAILING WELLS

Application filed July 18, 1927. Serial No. 206,684.

This invention relates to recovery of oil from flowing wells of low production and the object thereof is to maintain the flow of failing wells for the purpose of prolonging their production periods and also to increase the yield both from failing wells and other flowing wells whose production volume is unsatisfactory.

These objects are attained by this invention which comprises introducing considerable quantities of gas, (preferably natural gas), under pressure into the lower portion of the oil column in a well whose flow is small in order to stimulate production and also to conserve formation gas and thus increase the productive life of the well. Otherwise briefly stated, the invention is a method for increasing the production of a flowing well by introducing a preferably soluble gas into the lower regions of the well to assist discharge. The gas may be introduced through a tube, the lower end of which is located at whatever level is found to be desirable for maximum recovery, and in this manner gas lift is set up to replace or assist the original flow. The amount of gas may be sufficient to atomize the oil and preferably will be sufficient for such purpose; but if desired, gas may be supplied in much smaller quantities whereby the flow of the well will be merely augmented by the expansive and lifting effects of such gas as is introduced, in which case the natural flow will not be entirely replaced by normal gas lift.

In the accompanying drawings wherein the method is diagrammatically represented;

Fig. 1 shows the manner of introduction of a gas-supply tube into the oil column of a lightly flowing or failing well;

Fig. 2 represents the introduction of gas into the oil in limited quantities merely to assist natural flow without removing the oil head;

Fig. 3 indicates the introduction of gas in large quantities to atomize and expel the oil head, much of which has been thus removed; and Fig. 4 represents the total replacement of natural flow by gas lift.

It is assumed that the well indicated is one of very small production or one wherein the production is gradually falling off. In carrying on this method, the casing 10 is provided with a gas supply tube 12 whose lower end is dropped down into the lower portion of the oil column. According to the method of operation indicated in Fig. 2, the normal flow of oil through the discharge connection 14 is merely assisted by the introduction of gas through said tube 12 into the lower part of the oil column under the influence of gas compressor 16, and by way of connection 18 which is controlled by a valve 20. According to this form of the invention, the gas so introduced is supplied in relatively small amount, which, however, expands as the oil rises toward the top and supplies an appreciable lifting effect which results in greatly increasing the quantity of oil discharged, but does not displace the oil column.

According to the modification indicated in Figures 3 and 4, the gas introduced through supply tube 12 is sufficient to atomize and entirely expel the oil column of Figures 1 and 2. Thereafter, gas introduction is continued in sufficient amounts to atomize the oil as it flows into the well and to maintain the oil level at about the lower end of the said tube. According to Figure 3, much of the oil column has been so removed, and in Figure 4 all of the column has been expelled. In this manner also, the quantity of oil discharged is greatly increased, that amount of gas being circulated through the well which will produce the maximum yield.

If desired, a connection 22 having a valve 24 may be provided between compressor 16 and casing 12 so that the gas may be introduced into the casing and the oil flowed out through the tube, in which case valves 20 and 25 in connections 18 and 14 are closed and valve 26 in flow tube 12 is opened.

In addition to increasing the production of a well of the character stated, this method presents the very desirable advantage that there is a marked decrease in the amount of formation gas discharged per unit of oil with relation to that normally discharged under natural flow of the well. Since it is the formation gas which is responsible for the movement of oil into the well, reduction of the amount of formation gas carried off with the oil results in prolonging the life of the well and increasing the production thereof.

As examples of such conservation of formation gas by this invention, the formation gas carried off per unit of oil was reduced 72% in one instance and 67.5% in another. At the same time the oil production was increased nearly five times in the first case and more than two and one-half times in the second. The actual figures in these two instances are as follows:

In the first, the net oil production was increased from 136 barrels to 766 barrels and the formation gas coming off was reduced from 1640 cu. ft. per barrel to 464 cu. ft. per barrel; in the second, the net oil production was increased from 110 barrels to 412 barrels and the formation gas was reduced from 3050 cu. ft. to 990 cu. ft.

It is to be understood that the pressure gas introduced into the well, instead of being furnished by the compressor, may be obtained from any adjacent well which supplies gas under a pressure sufficiently high for the purpose.

The above disclosures are to be considered merely as illustrative of the generic invention and not as limiting, since many variations may be made within the scope of the following claim.

I claim:

A method of flowing a naturally flowing oil well whose flow is failing which comprises introducing gas under pressure into such well at a time during its natural flow when its flow is failing and before natural flow has failed, withdrawing oil and gas from the well and continuing the flowing of said well by gas introduction thereby increasing the production of oil from the well and reducing the amount of formation gas discharged per unit of oil.

Signed at Los Angeles, in the county of Los Angeles, and state of California, this 9th day of July, A. D. 1927.

FRANK F. HILL.